W. SIVERD.
BACK STOP OR BRAKE FOR VEHICLES.
APPLICATION FILED JUNE 5, 1913.
1,106,321.
Patented Aug. 4, 1914.
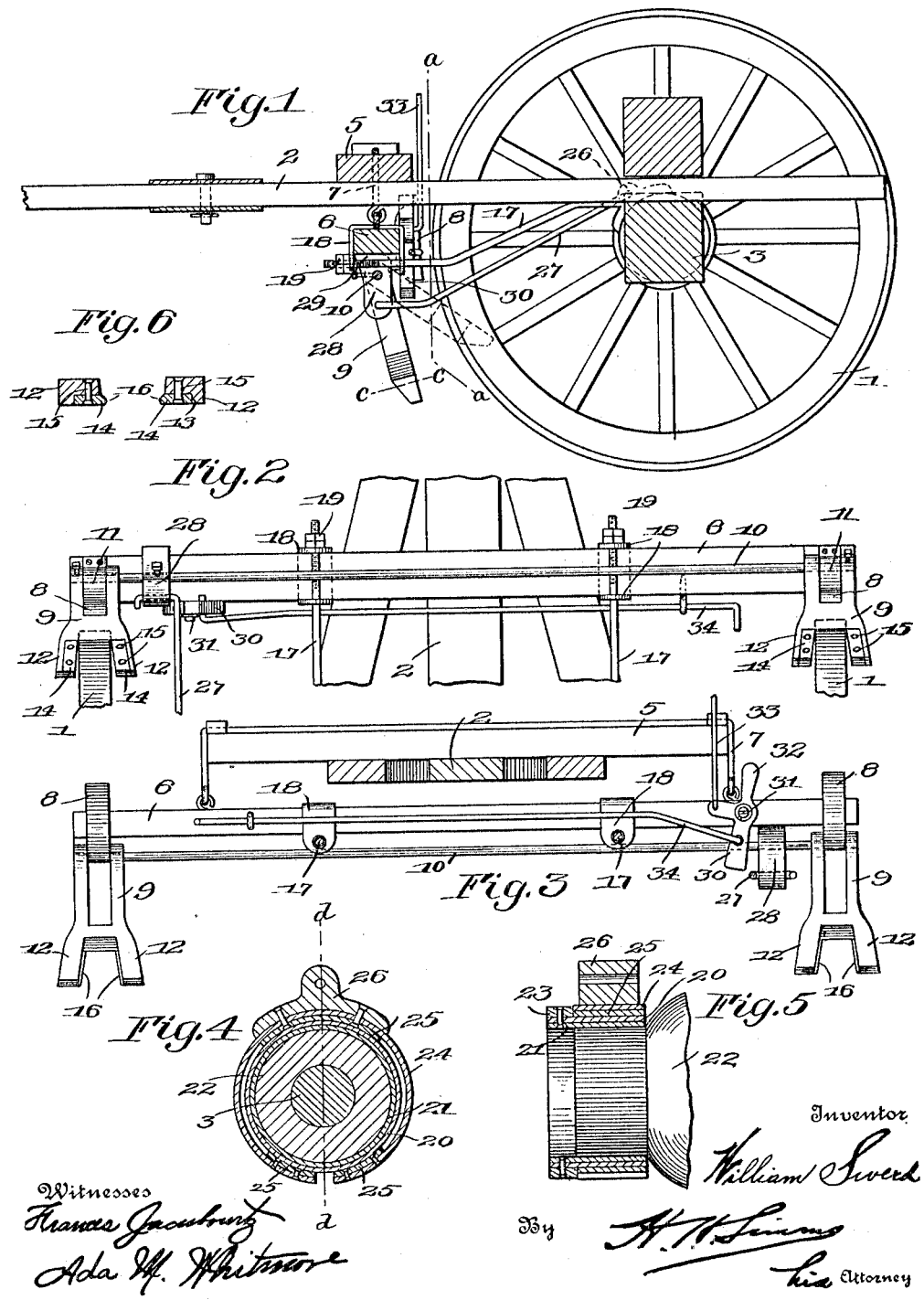

UNITED STATES PATENT OFFICE.

WILLIAM SIVERD, OF GENESEE, NEW YORK.

BACK-STOP OR BRAKE FOR VEHICLES.

1,106,321.  Specification of Letters Patent.  Patented Aug. 4, 1914.

Application filed June 5, 1913. Serial No. 771,830.

*To all whom it may concern:*

Be it known that I, WILLIAM SIVERD, of Genesee, in the county of Livingston and State of New York, have invented a new and useful Improvement in Back-Stops or Brakes for Vehicles, which improvement is fully set forth in the following specification and shown in the accompanying drawings.

The present invention relates to back stops or brakes for vehicles and an object of the same is to provide a simple and inexpensive construction which will be thrown and held out of operation during the forward movement of the vehicle and which will be thrown and held in operation during the rearward movement of the vehicle.

Another object of the invention is to provide a stop which will coöperate with the tire of a vehicle wheel and will be supported from the usual brake beam so that but a small number of parts are utilized for supporting the operative parts of the invention.

To these and other ends the invention consists in certain parts and combinations of parts all of which will be hereinafter described, the novel features being pointed out in the appended claims.

In the drawings: Figure 1 is a central section through the rear portion of a wagon embodying the present improvements; Fig. 2 is a view of the under side of the brake beam of the wagon showing the stop elements coöperating with the vehicle wheels; Fig. 3 is a section on the line $a$—$a$, Fig. 1; Fig. 4 is a transverse section through the wheel hub and friction clutch; Fig. 5 is a section on the line $d$—$d$, Fig. 4; and Fig. 6 is a section on the line $c$—$c$, Fig. 1.

Referring more particularly to the drawings, 1 indicates the vehicle wheels, 2 the hounds, 3 the axle supporting the hounds, 5 the cross bar, and 6 the brake beam which is supported from the cross bar 5 by a swinging member 7 to carry the brake shoes 8 to the wheels 1.

So far as the invention is broadly concerned, the type of the vehicle is immaterial although the manner of supporting the back stop mechanism on the above described type of vehicle does, in a specific sense, form part of the present improvements.

In the illustrated embodiment, two back stops or wheel clutches 9 are employed, said stops being in the form of bifurcated swinging arms arranged to straddle the rims of the two rear wheels and preferably carried by a common shaft 10 journaled at 11 on the under side of the brake beam 6. The arms 12 of the bifurcated portion of the stops or clutches 9 preferably have on their under faces, pockets or recesses 13 which receive steel wear pieces 14, the latter being held in the seats 13 by rivets or bolts 15. The wear pieces 14 project beyond the inner faces of the arms 12 and are provided with knife edges 16 formed by beveling opposite corners of the pieces 12, one bevel being greater than the other so that, notwithstanding the wearing action produced thereon by the wheel, a substantially sharp edge is maintained.

In order to adapt the brake beam as a support for these clutch members, suitable stopping means is provided for limiting the forward movement of the brake beam. In this instance, two longitudinally extending rods 17 are provided, being secured to the rear hounds and extending forwardly so as to pass through alined and perforated lugs 18 on the brake beam, the forward ends of said rods 17 having stops 19 thereon in the form of nuts which limit the swinging movement of the brake beam in the forward direction.

The clutch members or back stops are connected to the wheels of the vehicle in such a manner that, when the wheels move rearwardly, the clutch members or stops will be thrown into binding engagement with the wheels, the turning of which will cause such binding engagement to be increased to such an extent that the wheels are entirely stopped. This connection between the wheels and the stop or clutch members is established through a clutch which, preferably, is in the form of a friction member and which has also the additional function of throwing the clutch or stop members 9 away from wheels when the latter are moving forwardly. In this instance, a wear band 20 is secured to the ordinary sand band 21 on the wheel hub 22. This wear band has a stop device 23 secured thereto for confining the friction ring 24 on the hub of the wheel and in engagement with the wear band, the friction ring being split and having steel pieces 25 or other friction producing surfaces for coöperation with the wear band 20. A head 26 is also secured to the friction ring 24 and, through the medium of a rod 27, is connected to an arm 28 on the rock shaft 10, said arm 28 having a shoulder 29 to coöperate with the under surface of the brake beam 6 in order to limit the forward movement of the bar or rod 27.

Suitable means may be provided for locking out of operation the back stop mechanism. In this instance, a latch 30 is pivoted at 31 to the rear face of the brake beam 6 and is adapted to be swung into the path of the arm 28 in order to prevent the forward movement of said arm. This latch may be controlled by a hand piece 32 thereon or by either of two operating connections 33 or 34, the former leading from the latch to a point adjacent to the seat of the driver while the latter extends transversely of the vehicle to the opposite side of said vehicle, in order that the latch may be operated from either side of the vehicle.

In the operation of the invention the latch 30 is first moved to the position shown in Fig. 3. As the vehicle moves forwardly, the wear band 20 causes said ring 24 to turn forwardly at the upper part thereof, thereby moving the rod or bar 27 forwardly until the shoulder 29 coöperates with the brake beam 6, in which position the clutch members or back stops will lie out of engagement with the rims of the rear wheels. Upon the rearward movement of the vehicle, the upper portion of the clutch ring 24 is moved rearwardly, causing the rod or bar 27 to pull to the rear and swinging the clutch members or back stops 9 to the position shown in dotted lines in Fig. 1. As soon as these clutch members or back stops engage the wheel, they bind against opposite sides of its rim, owing to the converging jaws of said back stops, thereby throwing said back stops into more firm engagement with the wheel, finally bringing the latter to a full stop.

From the foregoing, it will be seen that there has been provided a back stop for a vehicle in which the forward movement of the vehicle causes said stop to be thrown out of and held out of engagement with the wheel while a rearward movement of the vehicle causes the stops to be moved rearwardly into binding engagement with the wheel. The stops are actuated through a clutch connection with one of the wheels and this clutch connection is so constructed that, after the stops have been moved to the desired positions in both directions, the wheels can continue turning without injury to the parts of the mechanism.

What I claim as my invention and desire to secure by Letters Patent is:

1. A vehicle back stop comprising a braking element, and a friction ring surrounding a portion of the wheel and having constant frictional engagement with the wheel to shift with the latter in the direction in which the wheel turns, and a connection between the friction ring and the braking element to shift the latter away from braking position when the vehicle moves forwardly and to braking position when the vehicle moves rearwardly.

2. In combination with a vehicle, a back stop therefor comprising a braking element having a bifurcated portion adapted to coöperate with the rim of the vehicle, and a clutch member frictionally movable with the wheel in opposite directions by a wheel of the vehicle and having connection with the braking element to shift the latter into and out of connection with the wheel.

3. In combination with a wheeled vehicle having a movable brake beam carrying shoes for coöperating with the wheels of the vehicle, a back stop comprising a shaft mounted on the brake beam, braking elements carried by said shaft for coöperating with the wheels of the vehicle, and a friction member frictionally coöperating with one of the wheels to be moved in either direction by said wheel, said friction member having connection with the rock shaft to shift the latter in opposite directions.

4. The combination with a wheeled vehicle having a movable brake beam carrying shoes for coöperating with the wheels of the vehicle, of a stop for limiting the movement of the brake beam away from the wheels, and a back stop comprising a braking element pivotally mounted on the brake beam for coöperation with one of the wheels of the vehicle, and a friction element moved in either direction by frictional engagement with one of the wheels of the vehicle and having connection with the braking element to shift the latter in opposite directions.

5. The combination with a wheeled vehicle having a movable brake beam carrying shoes for coöperating with certain wheels of the vehicle, of a stop for limiting the movement of the brake beam away from the wheels, a rock shaft mounted on the brake beam, a pair of braking elements carried by the rock shaft and having bifurcated portions adapted to straddle the wheels to coöperate with the rims of such wheels, a friction device movable in either direction by frictional engagement with one of the wheels of the vehicle, and a rod connecting such friction device with the rock shaft in order to move the latter in opposite directions.

6. The combination with a wheeled vehicle having a movable brake beam carrying shoes for coöperating with the wheels of the vehicle, of a stop for limiting the movement of the brake beam away from the wheel, and a back stop mechanism comprising a rock shaft mounted on the brake beam, a pair of braking elements for coöperating with the wheels of the vehicle carried by said rock shaft, a stop for limiting the movement of the rock shaft to limit the movement of the braking element away from the vehicle, a friction ring coöperating with one of the wheels of the vehicle, and a rod connecting such friction ring and the rock shaft to transmit movement of the ring to the rock shaft.

7. In a vehicle brake, the combination with a braking element, of a friction device actuated in either direction by frictional engagement with a wheel of the vehicle and connected to the braking element to move the latter in opposite directions, and a device for holding said braking element against movement to braking position under the action of the friction device.

8. In combination with a wheeled vehicle having a movable brake beam carrying brake shoes for coöperation with wheels of the vehicle, a rock shaft carried by such brake beam, a pair of braking elements carried by the rock shaft and adapted to coöperate with the wheels of the vehicle, a friction ring surrounding one of the wheels of the vehicle, an arm on the rock shaft, a rod connecting the arm and the friction ring to transmit motion from the ring to the rock shaft, and a latch mounted on the brake beam and movable to coöperate with the arm to hold the latter against movement and thus render the back stop ineffective.

WILLIAM SIVERD.

Witnesses:
HAROLD H. SIMMS,
ADA M. WHITMORE.

---

Copies of this patent may be obtained for five cents each, by addressing the "Commissioner of Patents, Washington, D. C."

It is hereby certified that in Letters Patent No. 1,106,321, granted August 4, 1914, upon the application of William Siverd, for an improvement in "Back-Stops or Brakes for Vehicles," the residence of the patentee was erroneously given as "Genesee, New York," whereas said residence should have been given as *Geneseo, New York;* and that the said Letters Patent should be read with this correction therein that the same may conform to the record of the case in the Patent Office.

Signed and sealed this 29th day of September, A. D., 1914.

[SEAL.]
R. F. WHITEHEAD,
*Acting Commissioner of Patents.*